(12) United States Patent
Kuribayashi

(10) Patent No.: US 12,065,010 B2
(45) Date of Patent: Aug. 20, 2024

(54) WORK VEHICLE

(71) Applicant: KUBOTA CORPORATION, Osaka (JP)

(72) Inventor: Takumi Kuribayashi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/131,928

(22) Filed: Apr. 7, 2023

(65) Prior Publication Data

US 2023/0339276 A1 Oct. 26, 2023

(30) Foreign Application Priority Data

Apr. 20, 2022 (JP) ................................. 2022-069225

(51) Int. Cl.
*B60G 3/24* (2006.01)

(52) U.S. Cl.
CPC .......... *B60G 3/24* (2013.01); *B60G 2200/422* (2013.01); *B60G 2204/45* (2013.01); *B60G 2300/082* (2013.01)

(58) Field of Classification Search
CPC .............. B62D 33/10; B62D 33/0608; B62D 33/0604; B60G 2300/082; B60G 2204/45; B60G 2200/422; B60G 3/24
USPC .................................................... 296/190.07
See application file for complete search history.

(56) References Cited

U.S. PATENT DOCUMENTS

| | | | | | |
|---|---|---|---|---|---|
| 2,911,052 | A | * | 11/1959 | Olley | B60G 3/24 180/370 |
| 3,871,467 | A | * | 3/1975 | Senft | B60G 21/055 280/124.135 |
| 4,235,470 | A | * | 11/1980 | Kauss | B62D 33/0604 296/190.07 |
| 4,735,272 | A | * | 4/1988 | Sjostrom | B62D 33/067 296/190.07 |
| 5,820,150 | A | * | 10/1998 | Archer | F16F 1/38 280/124.141 |
| 6,012,724 | A | * | 1/2000 | Pitkanen | B60G 7/008 180/41 |
| 6,105,984 | A | * | 8/2000 | Schmitz | B60G 11/14 280/124.179 |
| 6,220,587 | B1 | * | 4/2001 | Mckenzie | B62D 33/0608 267/259 |
| 7,252,169 | B2 | * | 8/2007 | McLean | B62D 49/04 180/209 |

(Continued)

FOREIGN PATENT DOCUMENTS

| | | | | |
|---|---|---|---|---|
| CN | 108688425 A | * | 10/2018 | ............. B60G 11/02 |
| DE | 102020205530 A1 | * | 4/2021 | ............. B62D 27/04 |

(Continued)

*Primary Examiner* — Amy R Weisberg
*Assistant Examiner* — Maxwell L Meshaka
(74) *Attorney, Agent, or Firm* — Greenblum & Bernstein, P.L.C.

(57) ABSTRACT

A work vehicle, comprises: an operation section occupiable by an operator; a cabin accommodating the operation section; left and right suspension mechanisms via which a body of the work vehicle supports a left portion and a right portion of the cabin; and left and right lateral rods configured to allow the cabin to move upward and downward relative to the body and restrain the cabin from moving leftward and rightward relative to the body.

14 Claims, 7 Drawing Sheets

(56) References Cited

U.S. PATENT DOCUMENTS

| | | | | |
|---|---|---|---|---|
| 7,849,946 | B2* | 12/2010 | Akeson | B62D 33/067 |
| | | | | 296/190.07 |
| 9,982,413 | B2* | 5/2018 | Paolini | B62D 33/0617 |
| 10,711,435 | B2* | 7/2020 | Hicke | E02F 9/08 |
| 10,717,475 | B2* | 7/2020 | Manternach | E02F 9/163 |
| 11,084,347 | B2* | 8/2021 | Wolf-Monheim | B60G 7/02 |
| 11,203,383 | B2* | 12/2021 | Manternach | B62D 33/0604 |
| 11,225,292 | B2* | 1/2022 | Hukkanen | B62D 33/10 |
| 11,299,002 | B2* | 4/2022 | Wietharn | B60G 21/00 |
| 11,639,202 | B2* | 5/2023 | Saroha | B62D 33/0604 |
| | | | | 296/190.07 |
| 2006/0090445 | A1* | 5/2006 | McLean | A01B 51/026 |
| | | | | 56/228 |
| 2006/0255623 | A1* | 11/2006 | Haller | B60G 17/052 |
| | | | | 296/190.07 |
| 2013/0277125 | A1* | 10/2013 | Moser | B60G 9/02 |
| | | | | 180/9.5 |
| 2018/0094404 | A1* | 4/2018 | Paolini | B62D 33/0604 |
| 2019/0315171 | A1* | 10/2019 | Wolf-Monheim | B60G 3/14 |
| 2020/0055552 | A1* | 2/2020 | Manternach | B62D 33/0604 |
| 2020/0172176 | A1* | 6/2020 | Manternach | B62D 33/0604 |
| 2020/0317018 | A1* | 10/2020 | Nong | G05D 1/027 |
| 2020/0331541 | A1* | 10/2020 | Hukkanen | B62D 33/063 |
| 2021/0129618 | A1* | 5/2021 | Wietharn | B60G 21/00 |
| 2021/0283968 | A1* | 9/2021 | Gaedker | G01G 19/10 |
| 2022/0135148 | A1* | 5/2022 | Saroha | B62D 65/04 |
| | | | | 296/190.07 |
| 2023/0219389 | A1* | 7/2023 | Lee | B60G 3/26 |
| | | | | 280/124.128 |
| 2023/0391408 | A1* | 12/2023 | Hirase | H05K 7/20927 |

FOREIGN PATENT DOCUMENTS

| | | | | |
|---|---|---|---|---|
| EP | 0518226 | A1 * | 12/1992 | |
| EP | 1405739 | A1 * | 4/2004 | B60G 3/24 |
| EP | 4265089 | A1 * | 10/2023 | A01B 59/068 |
| JP | 5394124 | B2 | 1/2014 | |
| JP | 2020103053 | A * | 7/2020 | A01D 41/02 |
| JP | 2020103054 | A * | 7/2020 | |
| JP | 2020103055 | A * | 7/2020 | |
| JP | 2020137524 | A * | 9/2020 | B60K 28/06 |
| WO | WO-8703259 | A1 * | 6/1987 | |
| WO | WO-9602397 | A1 * | 2/1996 | B60G 3/24 |
| WO | WO-2019129931 | A1 * | 7/2019 | B62D 33/063 |

* cited by examiner

WORK VEHICLE

CROSS REFERENCE TO RELATED APPLICATIONS

This application claims the benefit of priority to Japanese Patent Application No. 2022-069225 filed on Apr. 20, 2022.

The entire contents of this application are hereby incorporated herein by reference.

BACKGROUND OF THE INVENTION

Field of the Invention

The present invention relates to a work vehicle.

Description of the Related Art

A tractor, which is an example of a work vehicle, may have a cabin supported by the body of the tractor via left and right suspension mechanisms, as disclosed in JP 5394124B. The tractor of JP 5394124B has lateral rods, which are connected to the body and the cabin, and the lateral rods allow the cabin to move upward and downward relative to the body and restrain the cabin from moving leftward and rightward relative to the body. The cabin of the work vehicle includes an operation section for an operator to board, and has a relatively large lateral width. In the case where the body supports the cabin via the suspension mechanisms, there is room for improvement in stably restraining the cabin from moving leftward and rightward with use of the lateral rods. The present invention provides a work vehicle having a cabin supported by the body of the vehicle via suspension mechanisms in such a manner as to stably restrain the cabin from moving leftward and rightward with use of lateral rods.

SUMMARY OF THE INVENTION

A work vehicle of the present invention comprises:
an operation section occupiable by an operator;
a cabin accommodating the operation section;
left and right suspension mechanisms via which a body of the work vehicle supports a left portion and a right portion of the cabin; and
left and right lateral rods configured to allow the cabin to move upward and downward relative to the body and restrain the cabin from moving leftward and rightward relative to the body,
wherein the right lateral rod is disposed rightward and laterally outward of the right suspension mechanism and is connected to the right portion of the cabin, and
the left lateral rod is disposed leftward and laterally outward of the left suspension mechanism and is connected to the left portion of the cabin.

According to the present invention, the body supports the cabin via the left and right suspension mechanisms, and the left and right lateral rods are provided. These lateral rods stably restrain the cabin from moving leftward and rightward even if the cabin has a relatively large lateral width. The right lateral rod is disposed rightward and laterally outward of the right suspension mechanism, and is connected to the right portion of the cabin. Also, the left lateral rod is disposed leftward and laterally outward of the left suspension mechanism, and is connected to the left portion of the cabin. This separates the left and right lateral rods from each other in the left-right direction, which is advantageous in terms of stably by the lateral rods restraining the cabin from moving leftward and rightward.

In one preferred embodiment of the work vehicle of the present invention,
the right lateral rod extends rightward and laterally outward in an obliquely downward direction from the right portion of the cabin while the operator is not in the operation section;
the left lateral rod extends leftward and laterally outward in an obliquely downward direction from the left portion of the cabin while the operator is not in the operation section; and
the left and right suspension mechanisms are configured in such a manner that the left and right lateral rods extend in an orientation close to a horizontal orientation while the operator is in the operation section.

According to the present invention, upon the operator boarding the operation section, the weight of the operator causes the suspension mechanisms to contract, and the left and right lateral rods extend in a direction close to a horizontal direction. The suspension mechanisms extending and contracting in this state swing the lateral rods upward and downward from a position of the lateral rods extending in the direction close to a horizontal direction. This is advantageous in terms of stably by the lateral rods restraining the cabin from moving leftward and rightward.

In one preferred embodiment of the present invention, the work vehicle further comprises:
a right elastic body included in the right suspension mechanism and configured to define a limit of contraction of the right suspension mechanism; and
a left elastic body included in the left suspension mechanism and configured to define a limit of contraction of the left suspension mechanism.

According to the present invention, the right elastic body defines a limit of contraction of the right suspension mechanism. Also, according to the present invention, the left elastic body defines a limit of contraction of the left suspension mechanism. Thus, if the right portion of the cabin is lowered relative to the body and the right suspension mechanism contracts, the right elastic body is configured to restrain the right portion of the cabin from being lowered unnecessarily. Further, if the left portion of the cabin is lowered relative to the body and the left suspension mechanism contracts, the left elastic body is configured to restrain the left portion of the cabin from being lowered unnecessarily. In this case, the right elastic body restrains the right portion of the cabin from moving downward while being elastically deformed, and the left elastic body restrains the left portion of the cabin from moving downward while being elastically deformed. This makes a shock unlikely to occur and improves ride quality for the operator in the operation section.

In one preferred embodiment of the present invention, the work vehicle further comprises:
a right rebound spring included in the right suspension mechanism, and configured to apply resistance to extension of the right suspension mechanism and not apply resistance to contraction of the right suspension mechanism; and
a left rebound spring included in the left suspension mechanism, and configured to apply resistance to extension of the left suspension mechanism and not apply resistance to contraction of the left suspension mechanism.

The operator in the operation section rarely feels uncomfortable about downward movement of either one of the left and right portions of the cabin, but may feel uncomfortable about upward movement of the other one of the left and right portions of the cabin. In other words, the operator in the operation section rarely feel uncomfortable about contraction of either one of the left and right suspension mechanisms, but may feel uncomfortable about extension of the other one of the left and right suspension mechanisms. According to the present invention, providing the rebound springs in the suspension mechanisms make it difficult for the left and right suspension mechanisms to extend, and make it difficult for the left and right portions of the cabin to move upward. The rebound springs make it difficult for the left and right suspension mechanisms to extend, and also make it difficult for the left and right portions of the cabin to move upward, thereby also suppressing rolling of the cabin relative to the body. This improves ride quality for the operator in the operation section.

In one preferred embodiment of the present invention, the work vehicle further comprises:
  a link mechanism disposed at a rear portion of the body and swingable upward and downward, extending rearward, and configured to support a work device;
  lift arms disposed at the rear portion of the body and swingable upward and downward, and configured to raise and lower the link mechanism; and
  lift cylinders connected to the body and the corresponding lift arms and configured to raise and lower the lift arms,
  wherein the right suspension mechanism is disposed rightward and laterally outward of the lift arms and the lift cylinders, and supports a rear right portion of the cabin, and
  the left suspension mechanism is disposed leftward and laterally outward of the lift arms and the lift cylinders, and supports a rear left portion of the cabin.

In a work device such as a tractor, there are cases where a link mechanism for supporting a work device is located at a rear portion of the body and extends rearward. The link mechanism (work device) is raised and lowered by providing the lift arm at the rear portion of the body which lift arm raises and lowers the link mechanism, connecting the lift cylinder to the body and lift arm, and raising and lowering the lift arm with the lift cylinder. According to the present invention, the left and right suspension mechanisms are disposed leftward and rightward, respectively, and laterally outward of the lift arm and the lift cylinder, and respectively support the rear left and right portions of the cabin. The left and right suspension mechanisms are thus separated from each other in the left and right direction, and stably support the cabin. Further, the left and right lateral rods are disposed leftward and rightward, respectively, and laterally outward of the left and right suspension mechanisms, the lift arm, and the lift cylinder. With this, interference between the lateral rods, the lift arm, and the lift cylinder can be avoided.

In one preferred embodiment of the present invention, the work vehicle further comprises:
  left and right rear axle cases extending leftward and rightward, respectively, and laterally outward from the rear portion of the body, and configured to hold left and right travel devices, respectively,
  wherein the right lateral rod is connected to the rear right portion of the cabin and the right rear axle case, and
  the left lateral rod is connected to the rear left portion of the cabin and the left rear axle case.

In a work device such as a tractor, the left and right rear axle cases extend leftward and rightward, respectively, and laterally outward from the rear portion of the body, and the rear axle cases hold the left and right travel devices (e.g. rear wheels or crawler travel devices). According to the present invention, the right lateral rod is connected to the rear right portion of the cabin and the right rear axle case. Also, the left lateral rod is connected to the rear left portion of the cabin and the left rear axle case. The lateral rods are connected to the body via the rear axle cases. The left and right lateral rods can be disposed leftward and rightward, respectively, and laterally outward of the left and right suspension mechanisms, the lift arm, and the lift cylinder without difficulty by effectively using the rear axle cases extending leftward and rightward and laterally outward from the body.

In one preferred embodiment of the work vehicle of the present invention,
  the right lateral rod has a right portion disposed within the right travel device in such a manner that the right portion of the right lateral rod overlaps the right travel device in a back view, and
  the left lateral rod has a left portion disposed within the left travel device in such a manner that the left portion of the left lateral rod overlaps the left travel device in a back view.

According to the present invention, the right lateral rod is connected to the right rear axle case, and the right portion of the right lateral rod is located within the right travel device. The left lateral rod is connected to the left rear axle case, and the left portion of the left lateral rod is located within the left travel device. This allows long lateral rods to be easily obtained, and is, therefore, advantageous in terms of stably restraining the cabin from moving leftward and rightward with use of the lateral rods. Further, with this configuration, the right travel device covers the right portion of the right lateral rod, and the left travel device covers the left portion of the left lateral rod. This makes it difficult for mud, dust, or the like to stick to the right portion of the right lateral rod and the left portion of the left lateral rod. This reduces the likelihood that stuck mud, dust, or the like impedes movement of the lateral rods, and is, therefore, advantageous in terms of stably restraining the cabin from moving leftward and rightward with use of the lateral rods.

In one preferred embodiment of the work vehicle of the present invention,
  the right lateral rod is disposed between the cabin and the right suspension mechanism in a side view, and
  the left lateral rod is disposed between the cabin and the left suspension mechanism in a side view.

According to the present invention, the right suspension mechanism supports the rear right portion of the cabin, and the right lateral rod is disposed between the cabin and the right suspension mechanism. The left suspension mechanism supports the rear left portion of the cabin, and the left lateral rod is disposed between the cabin and the left suspension mechanism. This enables the lateral rods to be disposed with effective use of spaces between the cabin and the suspension mechanisms, and can thus realize space-saving in the placement of the lateral rods.

In one preferred embodiment of the work vehicle of the present invention,
  the right suspension mechanism is connected to the rear right portion of the cabin and the right rear axle case, and
  the left suspension mechanism is connected to the rear left portion of the cabin and the left rear axle case.

According to the present invention, the right suspension mechanism is connected to the rear right portion of the cabin and the right rear axle case. The left suspension mechanism is connected to the rear left portion of the cabin and the left rear axle case. With this configuration, the suspension mechanisms are connected to the body via the rear axle cases. The left and right suspension mechanisms can be disposed leftward and rightward, respectively, and laterally outward of the lift arm and the lift cylinder without difficulty by effectively using the rear axle cases extending leftward and rightward, and laterally outward from the body.

In one preferred embodiment of the present invention, the work vehicle further comprises:
left and right support members attached respectively to the left and right rear axle cases,
wherein the right suspension mechanism and the right lateral rod are connected to the right support member, and
the left suspension mechanism and the left lateral rod are connected to the left support member.

According to the present invention, the support members are used as both members for connecting the suspension mechanisms to the rear axle cases and members for connecting the lateral rods to the rear axle cases, due to the suspension mechanisms and the lateral rods being connected to the rear axle cases via common support members. This is advantageous in terms of simplifying the structure.

In one preferred embodiment of the present invention, the work vehicle further comprises:
a right lower limit stopper attached to the right support member and defining a lower limit position of upward and downward movement of the rear right portion of the cabin relative to the body; and
a left lower limit stopper attached to the left support member and defining a lower limit position of upward and downward movement of the rear left portion of the cabin relative to the body.

According to the present invention, the work vehicle has the right lower limit stopper and the left lower limit stopper. The right lower limit stopper defines the lower limit position of upward and downward movement of the rear right portion of the cabin relative to the body. The left lower limit stopper defines the lower limit position of upward and downward movement of the rear left portion of the cabin relative to the body. This configuration restrains the rear left and right portions of the cabin from unnecessarily moving downward. The lower limit stoppers are attached to the support members. The support members are used as members for attaching the lower limit stoppers to the rear axle cases. This is advantageous in terms of simplifying the structure. In this case, if the suspension mechanisms include the elastic bodies that define the limit of contraction of the aforementioned suspension mechanisms, cooperation of the elastic bodies and the lower limit stoppers stably restrains the left and right portions of the cabin from unnecessarily moving downward, with less shock.

In one preferred embodiment of the present invention, the work vehicle further comprises:
a right upper limit stopper attached to the right support member and defining an upper limit position of upward and downward movement of the rear right portion of the cabin relative to the body; and
a left upper limit stopper attached to the left support member and defining an upper limit position of upward and downward movement of the rear left portion of the cabin relative to the body.

According to the present invention, the work vehicle includes the right upper limit stopper and the left upper limit stopper. The right upper limit stopper defines the upper limit position of upward and downward movement of the rear right portion of the cabin relative to the body. The left upper limit stopper that defines the upper limit position of upward and downward movement of the rear left portion of the cabin relative to the body. This configuration restrains the rear left and right portions of the cabin from unnecessarily moving upward. The upper limit stoppers are attached to the support members. The support members are used as members for attaching the upper limit stoppers to the rear axle cases. This is advantageous in terms of simplifying the structure. In this case, with the aforementioned rebound springs provided in the suspension mechanisms, cooperation of the rebound springs and the upper limit stoppers stably restrains the left and right portions of the cabin from unnecessarily moving upward, with less shock.

In one preferred embodiment of the present invention, the work vehicle further comprises:
fixing members holding the corresponding rear axle cases together with the corresponding support members; and
restraint rods configured to restrain the link mechanism from being displaced in a left-right direction and connected to the link mechanism and the corresponding fixing members,
wherein the support members are attached to the corresponding rear axle cases due to the support members and the corresponding fixing members being coupled to each other while holding the corresponding rear axle cases therebetween.

According to the present invention, when the support members are attached to the rear axle cases, the fixing members are prepared, and the support members are attached to the rear axle cases by coupling the support members to the fixing members with the rear axle cases held between the support members and the fixing members. In a work vehicle such as a tractor in which the link mechanism for holding the work device is provided at a rear portion of the body of the vehicle and extend rearward, a configuration that prevents displacement (shake) of the link mechanism in the left-right direction may be provided. The restraint rods are connected to the link mechanism and the fixing members and restrain the link mechanism from being displaced (shaken) in the left-right direction. The fixing members are also used as members for attaching the restraint rods to the rear axle cases, which is advantageous in terms of simplifying the structure.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Modes for carrying out the present invention will be described with reference to the drawings showing a tractor as an example of a work vehicle. When defining a front-back direction of the work vehicle in the embodiment, it is defined along a travelling direction of a body of the work vehicle, and when defining the left right direction of the work vehicle, left and right are defined as seen in the travelling direction view of the body. That is, an "F" arrow as shown in FIGS. 1 to 6 indicates forward of the body, a "B" arrow as shown in FIGS. 1 to 6 indicates backward of the body, a "L" arrow as shown in FIGS. 1 to 6 indicates leftward of the body and a "R" arrow as shown in FIGS. 1 to 6 indicates rightward of the body. Therefore, the left and right directions of the body correspond to the width direction of the body.

Overall Configuration of Tractor

Figure 1:
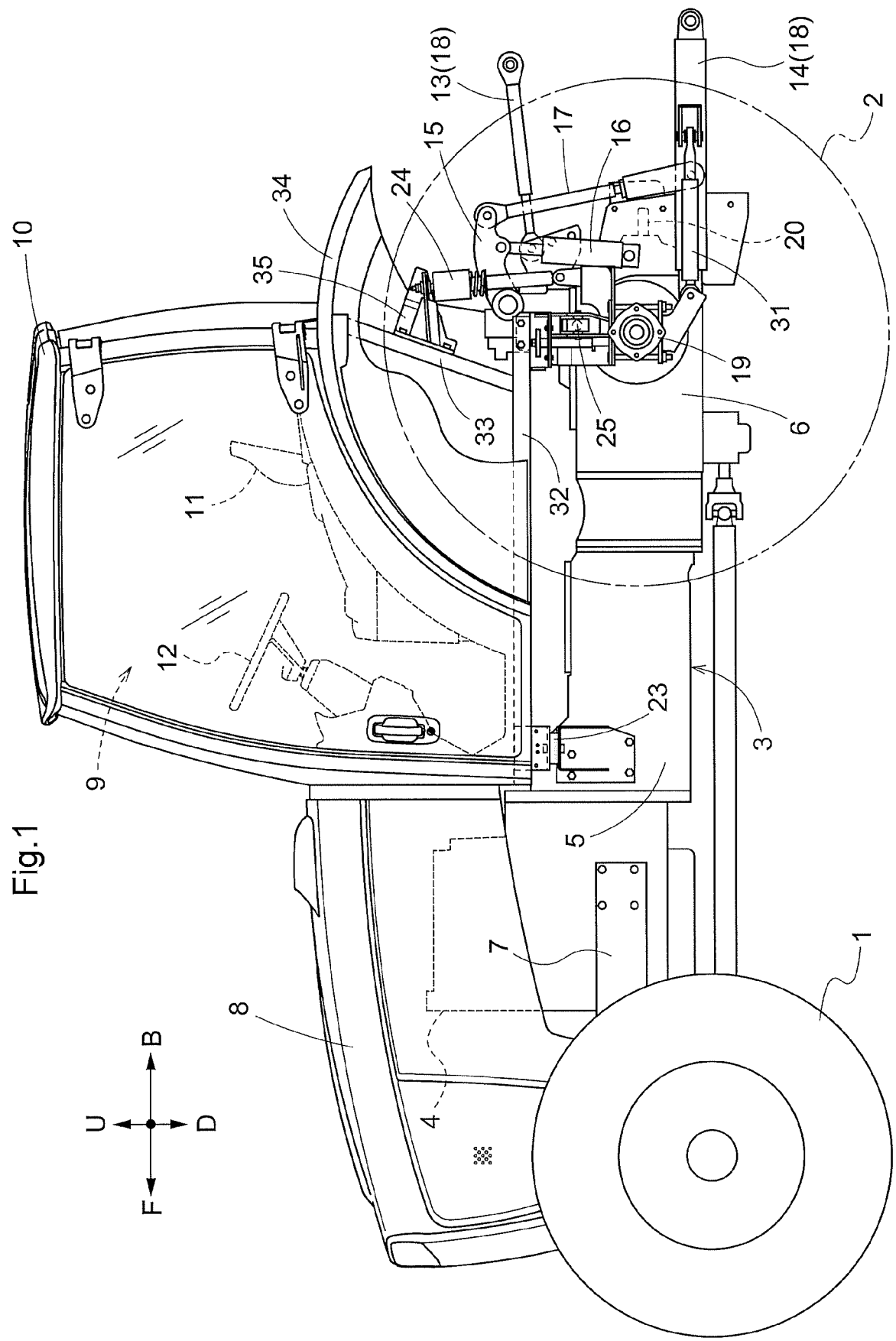
FIG. 1 is a left side view of a tractor.

As shown in FIG. 1, left and right front wheels 1 and left and right rear wheels 2 support a body 3 of the tractor. The body 3 has an engine 4, a clutch housing 5 coupled to a rear portion of the engine 4, a transmission case 6 coupled to a rear portion of the clutch housing 5, a front frame 7 coupled to a front portion of the engine 4, and so on. Each of the left and right front wheels 1 and the left and right rear wheels 2 corresponds to a "travel device" recited in the claims.

Figure 2:
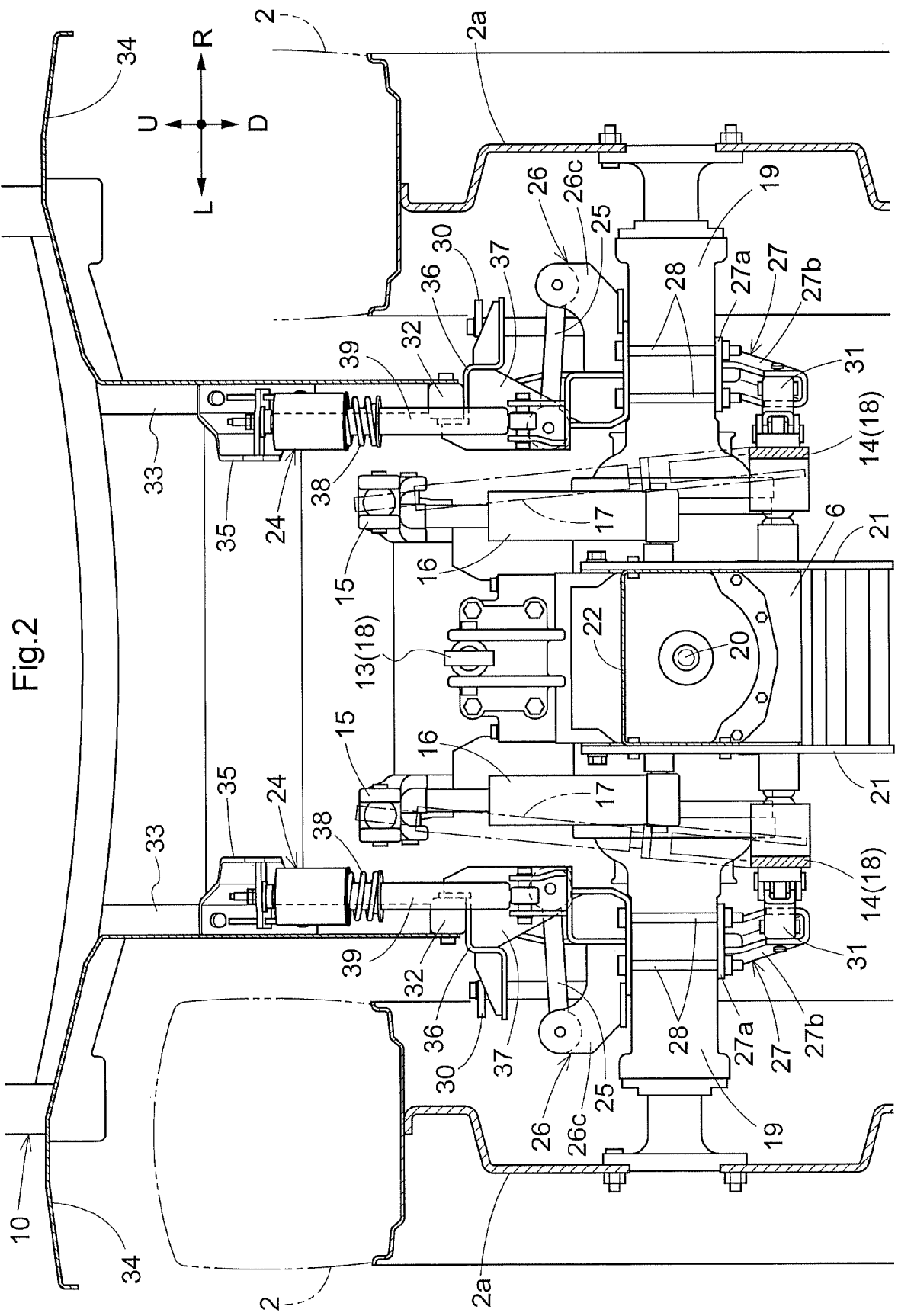
FIG. 2 is a back view of a rear portion of the tractor.
Figure 3:
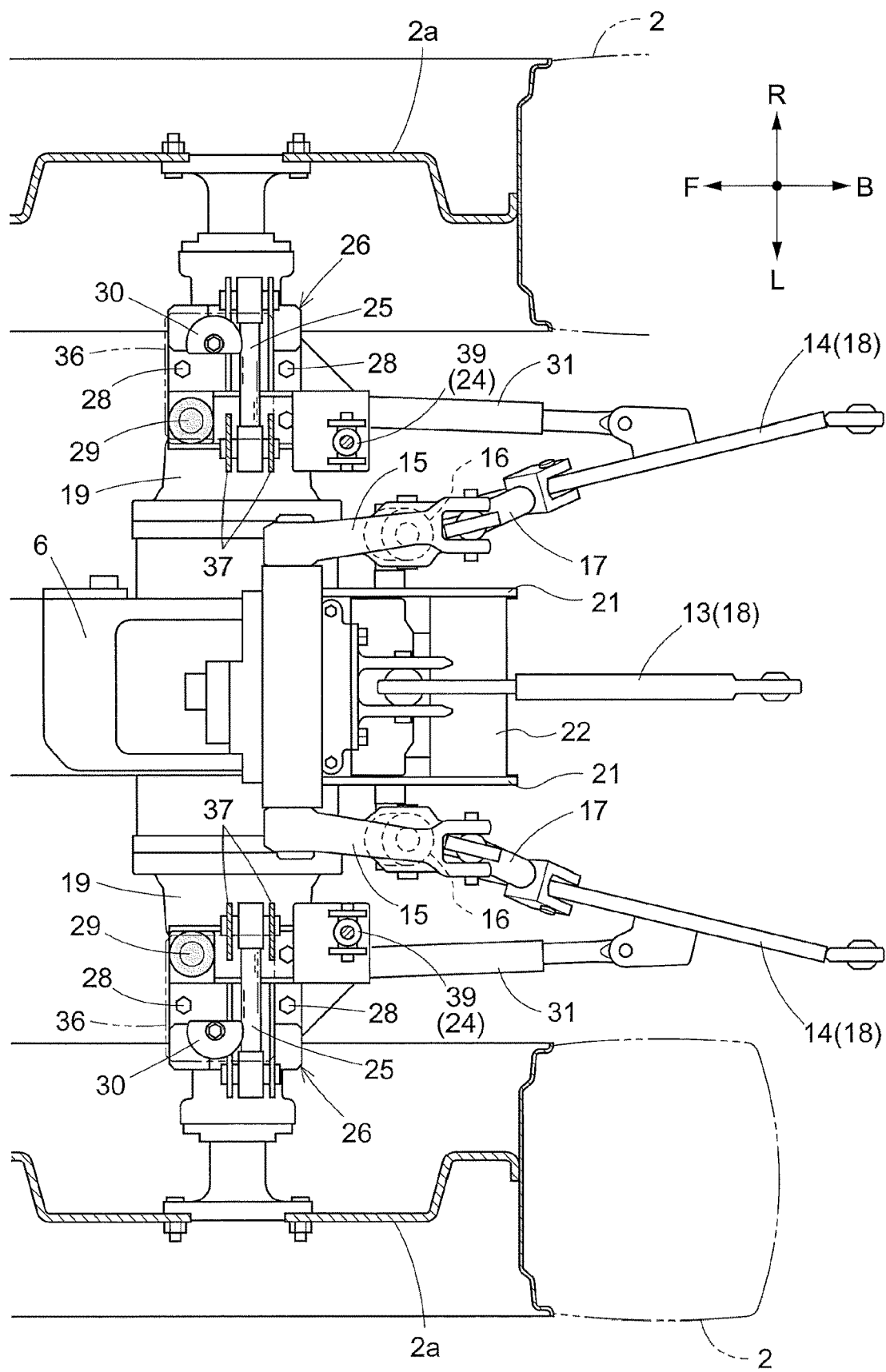
FIG. 3 is a plan view of the rear portion of the tractor.

The front frame 7 holds the front wheels 1. Left and right rear axle cases 19 are coupled to a rear portion of the transmission case 6 (body 3) and extend leftward and rightward, respectively, and laterally outward from the rear portion of the transmission case 6 (body 3), as shown in FIGS. 2 and 3. The left and right rear axle cases 19 hold the left and right rear wheels 2. A hood 8 is provided at a front portion of the body 3, as shown in FIG. 1. The hood 8 covers the engine 4. An operation section 9 for an operator to board is provided at a rear portion of the body 3. The operation section 9 is accommodated in a cabin 10. The operation section 9 includes an operation seat 11 and a steering handle 12 with which the operator steers the front wheels 1.

Configuration to Hold a Work Device

One top link 13 and left and right lower links 14 are provided at the rear portion of the transmission case 6 (body 3) and swingable upward and downward, as shown in FIGS. 1, 2, and 3. The top link 13 and the lower links 14 extend rearward. The top link 13 and the lower links 14 constitute a link mechanism 18 of a three-point link type. A work device, such as a rotary tilling device (not shown) or a plow (not shown), is connected to and held by the link mechanism 18.

A PTO shaft 20 is provided at the rear portion of the transmission case 6 (body 3). Motive power from the PTO shaft 20 is transferred, via a transfer shaft (not shown), to the work device held by the link mechanism 18. Left and right cover members 21, each having a flat plate shape, are coupled to the rear portion of the transmission case 6 (body 3). The cover member 22 is coupled to the left and right cover members 21. The cover members 21 and 22 cover the PTO shaft 20 from the laterally outer sides and from above.

Left and right lift arms 15 are provided at an upper portion of the transmission case 6 (body 3) and swingable upward and downward. Left and right lift cylinders 16 are connected to the corresponding lift arms 15 and the corresponding cover members 21. The lift cylinders 16 are connected to the transmission case 6 (body 3) via the cover members 21.

Link rods 17 are connected to the corresponding lift arms 15 and the corresponding lower links 14. The lower links 14 (link mechanism 18) and the work device are raised and lowered as a result of the lift arms 15 being raised and lowered by the lift cylinders 16.

Summary of Support Structure of Cabin

The clutch housing 5 (body 3) supports a front right portion of the cabin 10 via a right vibration isolation rubber 23, as shown in FIGS. 1, 2, and 3. The clutch housing 5 (body 3) supports a front left portion of the cabin 10 via a left vibration isolation rubber 23. The body 3 supports a rear right portion of the cabin 10 via a right suspension mechanism 24. The body 3 supports a rear left portion of the cabin 10 via a left suspension mechanism 24.

With this, the suspension mechanisms 24 move the rear portion of the cabin 10 upward and downward relative to the body 3 with a front lower portion (vibration isolation rubbers 23) of the cabin 10 as a fulcrum. The tractor has left and right lateral rods 25. The left and right lateral rods 25 allow the cabin 10 to move upward and downward relative to the body 3 and restrain the cabin 10 from moving leftward and rightward relative to the body 3.

Configuration of Support Members and Fixing Members

The tractor has left and right support members 26 and left and right fixing members 27, as shown in FIGS. 2 and 3.

Figure 4:
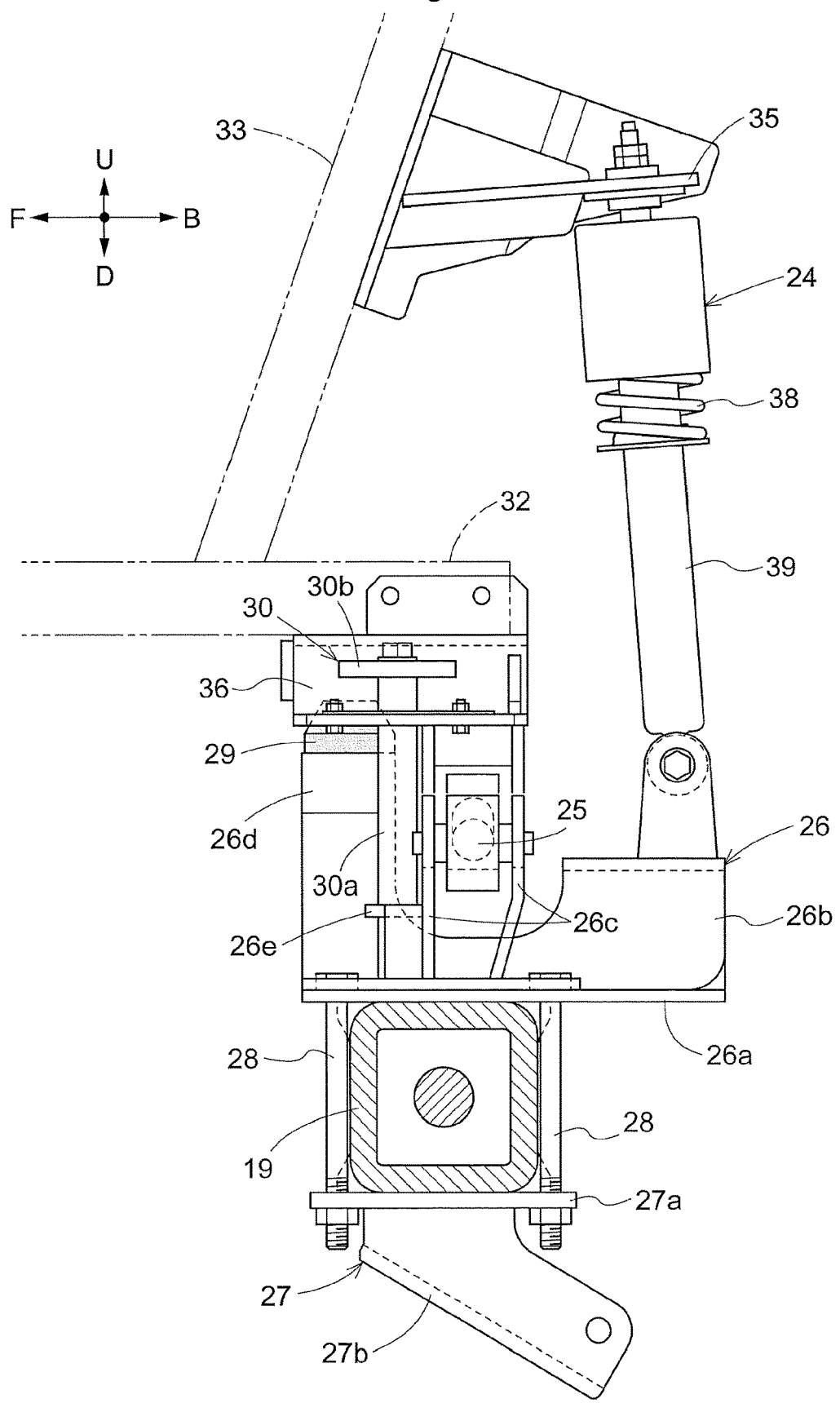
FIG. 4 is a left side view of a region around a left suspension mechanism and a left lateral rod.
Figure 5:
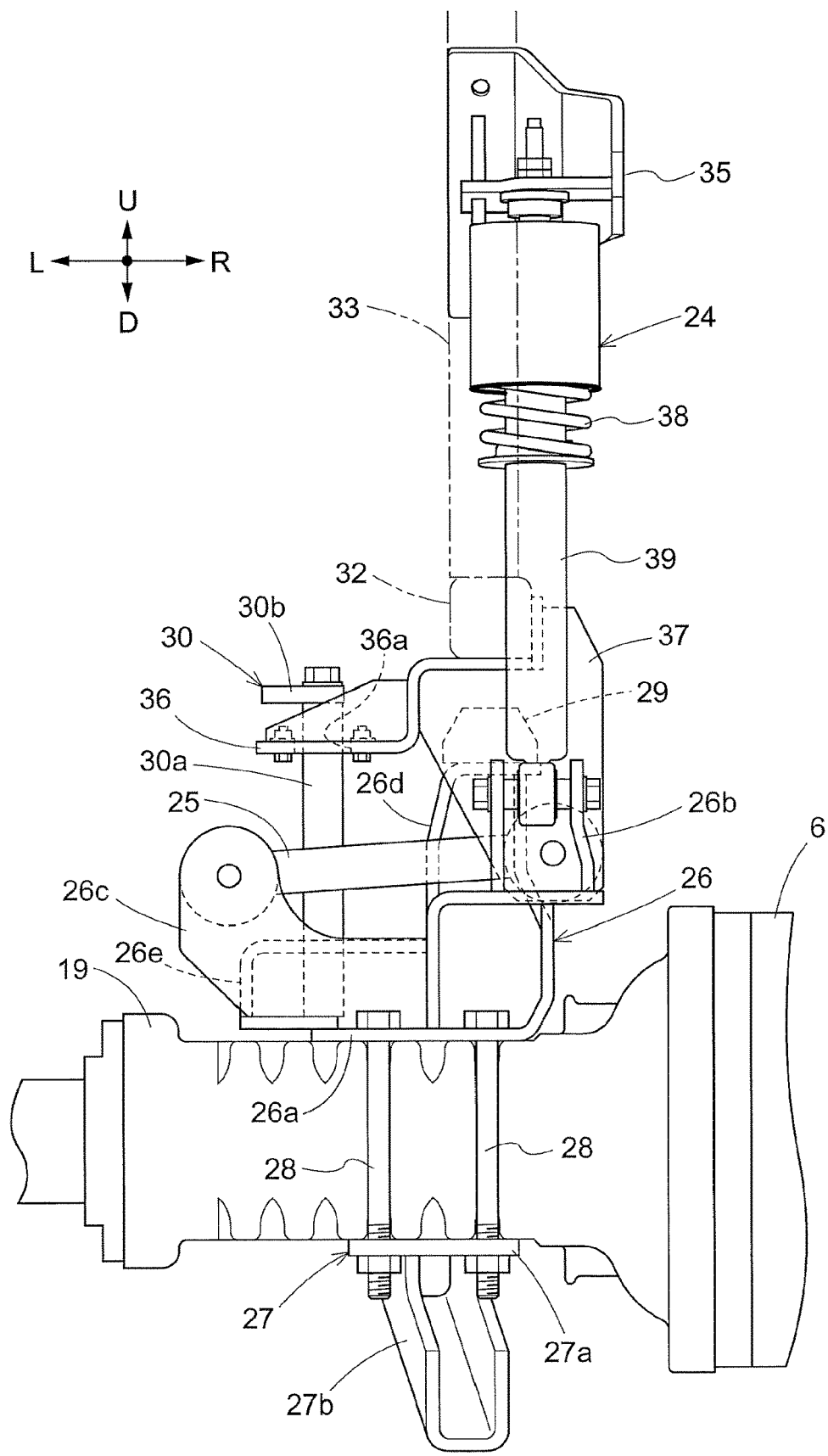
FIG. 5 is a back view of a region around the left suspension mechanism and the left lateral rod.
Figure 6:
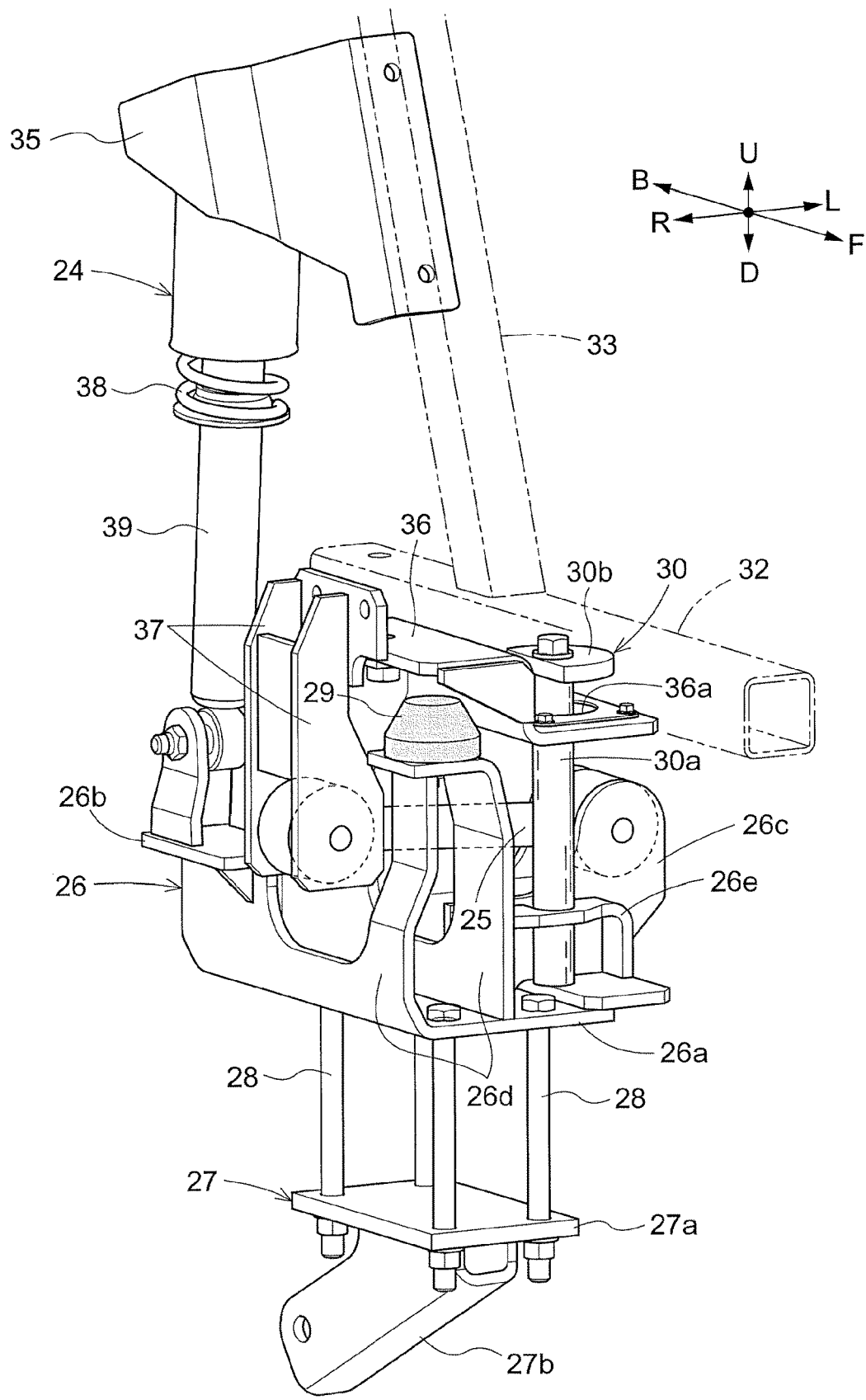
FIG. 6 is a perspective view of a region around the left suspension mechanism and the left lateral rod.

The support members 26 abut against upper faces of the corresponding rear axle cases 19, as shown in FIGS. 4, 5, and 6. The fixing members 27 abut against lower faces of the corresponding rear axle cases 19. The support members 26 and the fixing members 27 hold the corresponding rear axle cases 19 therebetween. Four bolts 28 are attached and fastened to the support members 26 and the fixing members 27.

The support members 26 and the fixing members 27 are coupled by the bolts 28 with the rear axle cases 19 being held between the support members 26 and the fixing members 27. With this configuration, the right support member 26 and the right fixing member 27 are attached to the right rear axle case 19. Also, with this configuration, the left support member 26 and the left fixing member 27 are attached to the left rear axle case 19.

Each support member 26 includes a base 26a having a flat plate shape. Four types of brackets 26b, 26c, 26d, and 26e are provided on the base 26a. The left and right support members 26 have laterally symmetrical shapes.

The bracket 26c of the right support member 26 is located within a wheel 2a of the right rear wheel 2 in such a manner as to overlap the wheel 2a of the right rear wheel 2 in a back view, as shown in FIG. 2. The bracket 26c of the left support member 26 is located within a wheel 2a of the left rear wheel 2 in such a manner as to overlap the wheel 2a of the left rear wheel 2 in a back view.

The tractor has left and right lower limit stoppers 29 and left and right upper limit stoppers 30 that are made of hard rubber, as shown in FIGS. 4, 5, and 6. The right lower limit stopper 29 is attached to the bracket 26d of the right support member 26. The left lower limit stopper 29 is attached to the bracket 26d of the left support member 26. The right upper limit stopper 30 is attached to the bracket 26e of the right support member 26. The left upper limit stopper 30 is attached to the bracket 26e of the left support member 26. Each upper limit stopper 30 includes a rod section 30a and a receiver section 30b having a flat plate shape attached to an upper portion of the rod section 30a. A lower portion of the rod section 30a is attached to the bracket 26e of the support member 26.

Each fixing member 27 has a base 27a having a flat plate shape. A bracket 27b is provided on the base 27a. The left and right fixing members 27 have laterally symmetrical shapes. The tractor has left and right restraint rods 31, as shown in FIGS. 1, 2, and 3. The right restraint rod 31 is connected to the right lower link 14 (link mechanism 18) and the bracket 27b of the right fixing member 27. The left restraint rod 31 is connected to the left lower link 14 (link mechanism 18) and the bracket 27b of the left fixing member 27. The restraint rods 31 restrain the link mechanism 18 from being displaced (shaken) in the left-right direction.

Placement of Suspension Mechanisms

Left and right frames 32 are coupled, in the front-back direction, respectively to lower left and right portions of the cabin 10, as shown in FIGS. 1 and 2. A right frame 33 is coupled to the rear right portion of the cabin 10 and a rear portion of the corresponding frame 32. A left frame 33 is coupled to the rear left portion of the cabin 10 and a rear portion of the corresponding frame 32. The frames 32 and 33 are parts of the cabin 10. Left and right rear wheel fenders 34 are attached to the frames 32 and 33. Left and right brackets 35 are coupled to the frames 33 and extend rearward.

The right suspension mechanism 24 is connected to the right bracket 35 and the bracket 26b of the right support member 26, as shown in FIGS. 4, 5, and 6. The left suspension mechanism 24 is connected to the left bracket 35 and the bracket 26b of the left support member 26.

With the above configuration, the right suspension mechanism 24 is located rightward and laterally outward of the right lift arm 15 and the right lift cylinder 16 in a back view, as shown in FIG. 2. The right suspension mechanism 24 is connected to the rear right portion of the cabin 10 and the right rear axle case 19. A lower portion of the right suspension mechanism 24 is connected to the rear portion of the transmission case 6 (body 3) via the right rear axle case 19.

The left suspension mechanism 24 is located leftward and laterally outward of the left lift arm 15 and the left lift cylinder 16 in a back view. The left suspension mechanism 24 is connected to the rear left portion of the cabin 10 and the left rear axle case 19. A lower portion of the left suspension mechanism 24 is connected to the rear portion of the transmission case 6 (body 3) via the right rear axle case 19.

Configuration of Suspension Mechanisms

Figure 7:
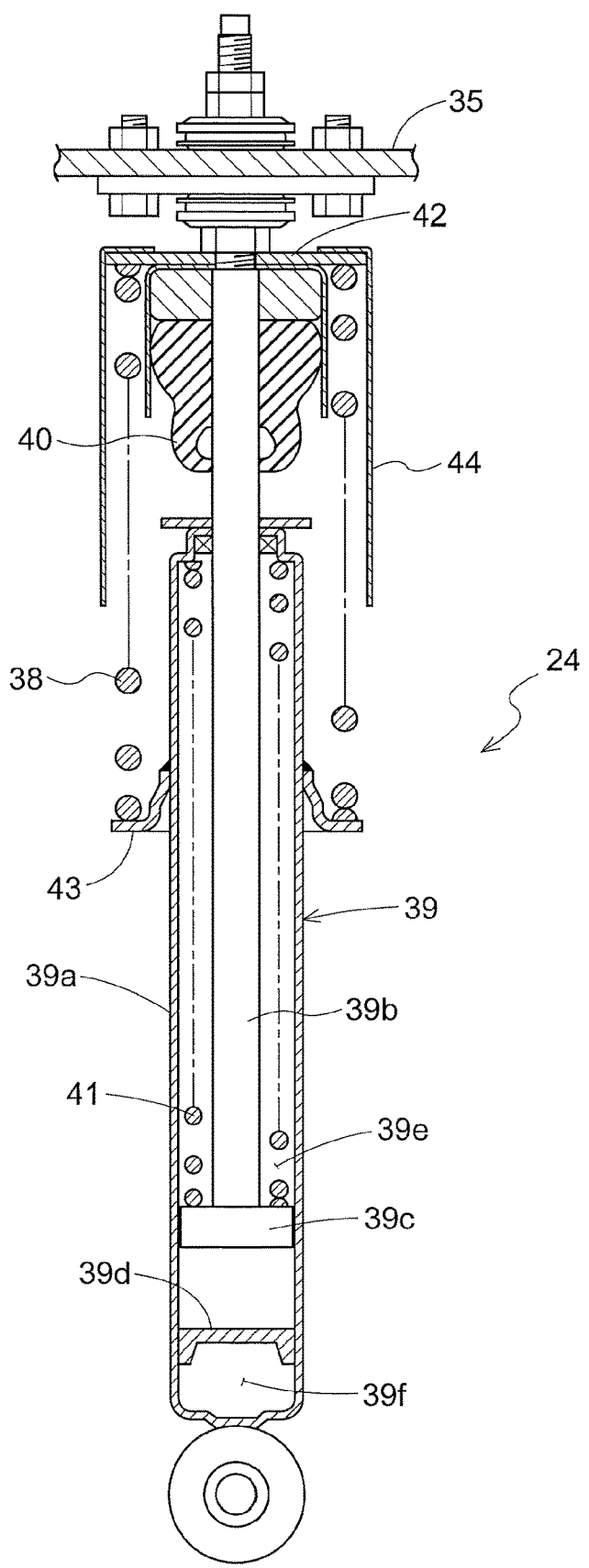
FIG. 7 is a vertical cross-sectional side view of the suspension mechanism.

The left and right suspension mechanisms 24 each have a suspension spring 38, a damper 39, an elastic body 40, a rebound spring 41, and so on, as shown in FIG. 7.

The damper 39 is of a single-tube type. The damper 39 has an outer cylinder 39a, a piston rod 39b, a piston 39c, a free piston 39d, and so on. The piston 39c, which has a piston valve (orifice) (not shown), is attached to a lower portion of the piston rod 39b within the outer cylinder 39a. The free piston 39d is located at a lower portion of the outer cylinder 39a, within the outer cylinder 39a. This constitutes an oil chamber 39e and a gas chamber 39f within the outer cylinder 39a.

A spring receiver 42 is coupled to an upper portion of the piston rod 39b of the damper 39. A spring receiver 43 is coupled to the outer cylinder 39a of the damper 39. The suspension spring 38 is attached to the spring receiver 42 and the spring receiver 43. A cover 44 that covers the suspension spring 38 is attached to the spring receiver 42.

The elastic body 40 is made of synthetic rubber, urethane, or the like, and has a cylindrical shape (ring shape). The elastic body 40 is located between an upper end of the outer cylinder 39a of the damper 39 and the spring receiver 42, and is attached to the piston rod 39b of the damper 39. The rebound spring 41 is attached to the upper end of the outer cylinder 39a of the damper 39 and the piston 39c, within the outer cylinder 39a of the damper 39.

In each suspension mechanism 24 configured as described above, an upper end of the piston rod 39b of the damper 39 is attached to the corresponding bracket 35 (see FIGS. 4, 5, and 6), and a lower end of the outer cylinder 39a of the damper 39 is attached to the bracket 26b of the corresponding support member 26.

Configuration of Lateral Rods

The tractor has left and right receiver plates 36, each of which is a plate material bent in a crank shape, as shown in FIGS. 4, 5, and 6. Each receiver plate 36 is coupled to a rear portion of the corresponding frame 32. The tractor has left and right brackets 37. Each bracket 37 is coupled to the rear portion of the corresponding frame 32.

The tractor has left and right lateral rods 25. The right lateral rod 25 is connected to the right bracket 37 and the bracket 26c of the right support member 26. The right lateral rod 25 is located between the brackets 26b and 26d of the right support member 26.

The left lateral rod 25 is connected to the left bracket 37 and the bracket 26c of the left support member 26. The left lateral rod 25 is located between the brackets 26b and 26d of the left support member 26.

The right lateral rod 25 extends rightward and laterally outward in an obliquely downward direction from the right bracket 37 (the rear right portion of the cabin 10) due to the configuration of the right suspension mechanism 24, while the operator is not in the operation section 9, as shown in FIGS. 2 and 5. The right lateral rod 25 is connected to the bracket 26c of the right support member 26.

The left lateral rod 25 extends leftward and laterally outward in an obliquely downward direction from the left bracket 37 (the rear left portion of the cabin 10) due to the configuration of the left suspension mechanism 24, while the operator is not in the operation section 9. The left lateral rod 25 is connected to the bracket 26c of the left support member 26.

Upon the operator entering the operation section 9, the suspension mechanisms 24 slightly contract due to the weight of the operator, and the orientations of the left and right lateral rods 25 shifts from the orientations shown in FIGS. 2 and 5 to orientations close to a horizontal orientation.

If, in the above state, the right suspension mechanism 24 contracts, i.e. if the rear right portion of the cabin 10 moves upward or downward, the right lateral rod 25 swings upward or downward from the orientation close to a horizontal direction, with the bracket 26c of the right support member 26 as a fulcrum. Also, if, in the above state, the left suspension mechanism 24 contracts, i.e. the rear left portion of the cabin 10 moves upward or downward, the left lateral rod 25 moves upward or downward from the orientation close to a horizontal direction, with the bracket 26c of the left support member 26 as a fulcrum. That is, the left and right lateral rods 25 allow the cabin 10 to move upward and downward relative to the body 3. This restrains the cabin 10 from moving leftward and rightward relative to the body 3.

With above configuration, the right lateral rod 25 is located rightward and laterally outward of the right suspension mechanism 24 and connected to the right portion of the cabin 10 in a back view, as shown in FIG. 2. The left lateral rod 25 is located leftward and laterally outward of the left suspension mechanism 24 and connected to the left portion of the cabin 10 in a back view.

The right lateral rod 25 is connected to the rear right portion of the cabin 10 and the bracket 26c of the right support member 26. A right portion of the right lateral rod 25 is connected to the right rear axle case 19 via the right support member 26.

The left lateral rod 25 is connected to the rear left portion of the cabin 10 and the bracket 26c of the left support member 26. A left portion of the left lateral rod 25 is connected to the left rear axle case 19 via the left support member 26.

The right portion of the right lateral rod 25 is located within the wheel 2a of the right rear wheel 2 in such a manner as to overlap the wheel 2a of the right rear wheel 2 in a back view. In other words, the bracket 26c of the right support member 26 is located within the wheel 2a of the right rear wheel 2 in such a manner as to overlap the wheel 2a of the right rear wheel 2 in a back view.

The left portion of the left lateral rod 25 is located within the wheel 2a of the left rear wheel 2 in such a manner as to overlap the wheel 2a of the left rear wheel 2 in a back view. In other words, the bracket 26c of the left support member 26 is located within the wheel 2a of the left rear wheel 2 in such a manner as to overlap the wheel 2a of the left rear wheel 2 in a back view.

The right lateral rod 25 is located forward of the right suspension mechanism 24 in a side view, as shown in FIGS. 1 and 4. The right lateral rod 25 is located between the cabin 10 and the right suspension mechanism 24 in the front-back direction. The left lateral rod 25 is located forward of the left suspension mechanism 24 in a side view. The left lateral rod 25 is located between the cabin 10 and the left suspension mechanism 24 in the front-back direction.

Configuration of Lower Limit Stoppers and Upper Limit Stoppers

The right lower limit stopper 29 is attached to the bracket 26d of the right support member 26, as shown in FIGS. 4, 5, and 6. The right lower limit stopper 29 is located below the right receiver plate 36. The left lower limit stopper 26 is attached to the bracket 26d of the left support member 26. The left lower limit stopper 29 is located below the left receiver plate 36.

The left and right receiver plates 36 each have an opening section 36a. The rod sections 30a of the left and right upper limit stoppers 30 penetrates the opening sections 36a of the corresponding receiver plates 36. The receiver section 30b of each upper limit stopper 30 has a diameter larger than the diameter of the opening section 36a of the receiver plate 36.

With the above configuration, the position of the right lower limit stopper 29 is the lower limit position of the upward and downward movement of the rear right portion of the cabin 10 relative to the body 3. When the right suspension mechanism 24 contracts and the rear right portion of the cabin 10 is lowered, the upper end of the outer cylinder 39a of the damper 39 comes into contact with the right elastic body 40 and compresses the right elastic body 40 in the right suspension mechanism 24, as shown in FIG. 7, slightly before the right receiver plate 36 comes into contact with the right lower limit stopper 29. The right receiver plate 36 comes into contact with the right lower limit stopper 29 with the right elastic body 40 being compressed. The right elastic body 40 and the right lower limit stopper 29 restrain the rear right portion of the cabin 10 from moving downward.

The position of the left lower limit stopper 29 is the lower limit position of the upward and downward movement of the rear left portion of the cabin 10 relative to the body 3. When the left suspension mechanism 24 contracts and the rear left portion of the cabin 10 is lowered, the upper end of the outer cylinder 39a of the damper 39 comes into contact with the left elastic body 40 and compresses the left elastic body 40 in the left suspension mechanism 24, as shown in FIG. 7, slightly before the left receiver plate 36 comes into contact with the left lower limit stopper 29. The left receiver plate 36 comes into contact with the left lower limit stopper 29 with the left elastic body 40 being compressed. The left elastic body 40 and the left lower limit stopper 29 restrain the rear left portion of the cabin 10 from moving downward.

The right receiver plate 36 is configured to come into contact with the right lower limit stopper 29 when the right elastic body 40 is compressed and reaches a contraction limit at which the elastic body 40 is no longer compressed even while receiving a compressive force. This enables the right elastic body 40 to absorb a shock while being compressed, and the right elastic body 40 reaching the contraction limit restrains the rear right portion of the cabin 10 from moving downward. This suppresses a shock while the right receiver plate 36 comes into contact with the right lower limit stopper 29. The left receiver plate 36 is configured to come into contact with the left lower limit stopper 29 when the left elastic body 40 is compressed and reaches a contraction limit. This enables the left elastic body 40 to absorb a shock while being compressed, and the left elastic body 40 reaching the contraction limit restrains the rear left portion of the cabin 10 from moving downward. This suppresses a shock while the left receiver plate 36 comes into contact with the left lower limit stopper 29.

When the right suspension mechanism 24 contracts, the piston 39c of the damper 39 in the right suspension mechanism 24 moves in a direction away from the rebound spring 41 (downward), as shown in FIG. 7. Thus, the right rebound spring 41 is not compressed and does not apply resistance to the contraction of the right suspension mechanism 24. When the left suspension mechanism 24 contracts, the piston 39c of the damper 39 in the left suspension mechanism 24 moves in a direction away from the rebound spring 41 (downward). Thus, the left rebound spring 41 is not compressed and does not apply resistance to the contraction of the left suspension mechanism 24.

The position of the receiver section 30b of the right upper limit stopper 30 is the upper limit position of the upward and downward movement of the rear right portion of the cabin 10 relative to the body 3. When the rear right portion of the cabin 10 is raised, the right receiver plate 36 comes into contact with the receiver section 30b of the right upper limit stopper 30 and thus restrains the rear right portion of the cabin 10 from moving upward.

The position of the receiver section 30b of the left upper limit stopper 30 is the upper limit position of the upward and downward movement of the rear left portion of the cabin 10 relative to the body 3. When the rear left portion of the cabin 10 is raised, the left receiver plate 36 comes into contact with the receiver section 30b of the left upper limit stopper 30 and thus restrains the rear left portion of the cabin 10 from moving upward.

When the right suspension mechanism 24 extends, the piston 39c of the damper 39 in the right suspension mechanism 24 moves in a direction approaching the rebound spring 41 (upward), as shown in FIG. 7. Thus, the piston 39c of the damper 39 compresses the rebound spring 41, and the right rebound spring 41 applies resistance to the extension of the right suspension mechanism 24. When the left suspension mechanism 24 extends, the piston 39c of the damper 39 in the left suspension mechanism 24 moves in a direction approaching the rebound spring 41 (upward), as shown in FIG. 7. Thus, the piston 39c of the damper 39 compresses the rebound spring 41, and the left rebound spring 41 applies resistance to the extension of the left suspension mechanism 24.

While the right suspension mechanism 24 is extending, the right rebound spring 41 absorbs a shock while being compressed. This suppresses a shock occurring in response to the right receiver plate 36 coming into contact with the receiver section 30*b* of the right upper limit stopper 30. While the left suspension mechanism 24 is extending, the left rebound spring 41 absorbs a shock while being compressed. This suppresses a shock occurring in response to the left receiver plate 36 coming into contact with the receiver section 30*b* of the left upper limit stopper 30.

First Variation of Implementation of the Invention

The rear section of the transmission case 6 (body 3) may alternatively support the rear left and right portions of the cabin 10 via the left and right vibration isolation rubbers 23. The clutch housing 5 (body 3) may alternatively support the front left and right portions of the cabin 10 via the left and right suspension mechanisms 24.

Second Variation of Implementation of the Invention

The rear axle cases 19 may hold crawler travel devices (not shown) serving as travel device, instead of the rear wheels 2.

Third Variation of Implementation of the Invention

In FIG. 7, the elastic body 40 may be connected to the upper end of the outer cylinder 39*a* of each damper 39 and the corresponding spring receiver 42 without a gap from the upper end of the outer cylinder 39*a* of the damper 39. The material of the elastic body 40 is not limited to synthetic rubber or urethane, and may alternatively be a metal short coil spring (not shown).

The present invention is applicable to not only tractors but also agricultural work vehicles such as combine harvesters with a cabin, and construction work vehicles such as backhoes and wheel loaders with a cabin.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle, comprising:
   an operation section occupiable by an operator;
   a cabin accommodating the operation section;
   left and right suspension mechanisms via which a body of the work vehicle supports a left portion and a right portion of the cabin; and
   left and right lateral rods configured to allow the cabin to move upward and downward relative to the body and restrain the cabin from moving leftward and rightward relative to the body,
   wherein the right lateral rod is disposed rightward and laterally outward of the right suspension mechanism and is connected to the right portion of the cabin, and
   the left lateral rod is disposed leftward and laterally outward of the left suspension mechanism and is connected to the left portion of the cabin.

2. The work vehicle according to claim 1, wherein
   the cabin is supported by the body,
   the left and right suspension mechanisms are interjacent between the body and the cabin, and
   the left and right lateral rods are interjacent between the body and the cabin.

3. The work vehicle according to claim 1, wherein:
   the right lateral rod extends rightward and laterally outward in an obliquely downward direction from the right portion of the cabin while the operator is not in the operation section;
   the left lateral rod extends leftward and laterally outward in an obliquely downward direction from the left portion of the cabin while the operator is not in the operation section; and
   the left and right suspension mechanisms are configured in such a manner that the left and right lateral rods extend in an orientation close to a horizontal orientation while the operator is in the operation section.

4. The work vehicle according to claim 1, further comprising:
   a right elastic body included in the right suspension mechanism and configured to define a limit of contraction of the right suspension mechanism; and
   a left elastic body included in the left suspension mechanism and configured to define a limit of contraction of the left suspension mechanism.

5. The work vehicle according to claim 1, further comprising:
   a right rebound spring included in the right suspension mechanism, and configured to apply resistance to extension of the right suspension mechanism and not apply resistance to contraction of the right suspension mechanism; and
   a left rebound spring included in the left suspension mechanism, and configured to apply resistance to extension of the left suspension mechanism and not apply resistance to contraction of the left suspension mechanism.

6. A work vehicle, comprising:
   an operation section occupiable by an operator;
   a cabin accommodating the operation section;
   left and right suspension mechanisms via which a body of the work vehicle supports a left portion and a right portion of the cabin;
   left and right lateral rods configured to allow the cabin to move upward and downward relative to the body and restrain the cabin from moving leftward and rightward relative to the body;
   a link mechanism disposed at a rear portion of the body and swingable upward and downward, extending rearward, and configured to support a work device;
   lift arms disposed at the rear portion of the body and swingable upward and downward, and configured to raise and lower the link mechanism; and
   lift cylinders connected to the body and the corresponding lift arms and configured to raise and lower the lift arms,
   wherein the right lateral rod is disposed rightward and laterally outward of the right suspension mechanism and is connected to the right portion of the cabin,
   the left lateral rod is disposed leftward and laterally outward of the left suspension mechanism and is connected to the left portion of the cabin,
   the right suspension mechanism is disposed rightward and laterally outward of the lift arms and the lift cylinders, and supports a rear right portion of the cabin, and
   the left suspension mechanism is disposed leftward and laterally outward of the lift arms and the lift cylinders, and supports a rear left portion of the cabin.

7. The work vehicle according to claim 6, further comprising:
   left and right rear axle cases extending leftward and rightward, respectively, and laterally outward from the rear portion of the body, and configured to hold left and right travel devices, respectively, wherein the right lateral rod is connected to the rear right portion of the cabin and the right rear axle case, and the left lateral rod is connected to the rear left portion of the cabin and the left rear axle case.

8. The work vehicle according to claim 7, wherein:

the right lateral rod has a right portion disposed within the right travel device in such a manner that the right portion of the right lateral rod overlaps the right travel device in a back view, and the left lateral rod has a left portion disposed within the left travel device in such a manner that the left portion of the left lateral rod overlaps the left travel device in a back view.

9. The work vehicle according to claim 8, wherein:

the right lateral rod is disposed between the cabin and the right suspension mechanism in a side view, and the left lateral rod is disposed between the cabin and the left suspension mechanism in a side view.

10. The work vehicle according to claim 9, wherein:

the right suspension mechanism is connected to the rear right portion of the cabin and the right rear axle case, and the left suspension mechanism is connected to the rear left portion of the cabin and the left rear axle case.

11. The work vehicle according to claim 10, further comprising:

left and right support members attached respectively to the left and right rear axle cases, wherein the right suspension mechanism and the right lateral rod are connected to the right support member, and the left suspension mechanism and the left lateral rod are connected to the left support member.

12. The work vehicle according to claim 11, further comprising:

a right lower limit stopper attached to the right support member and defining a lower limit position of upward and downward movement of the rear right portion of the cabin relative to the body; and a left lower limit stopper attached to the left support member and defining a lower limit position of upward and downward movement of the rear left portion of the cabin relative to the body.

13. The work vehicle according to claim 11, further comprising:

a right upper limit stopper attached to the right support member and defining an upper limit position of upward and downward movement of the rear right portion of the cabin relative to the body; and a left upper limit stopper attached to the left support member and defining an upper limit position of upward and downward movement of the rear left portion of the cabin relative to the body.

14. The work vehicle according to claim 11, further comprising:

fixing members holding the corresponding rear axle cases together with the corresponding support members; and restraint rods configured to restrain the link mechanism from being displaced in a left-right direction and connected to the link mechanism and the corresponding fixing members, wherein the support members are attached to the corresponding rear axle cases due to the support members and the corresponding fixing members being coupled to each other while holding the corresponding rear axle cases therebetween.

* * * * *